June 24, 1930.   J. B. ELLINGER   1,766,116
MECHANICAL ANIMAL
Filed March 18, 1929
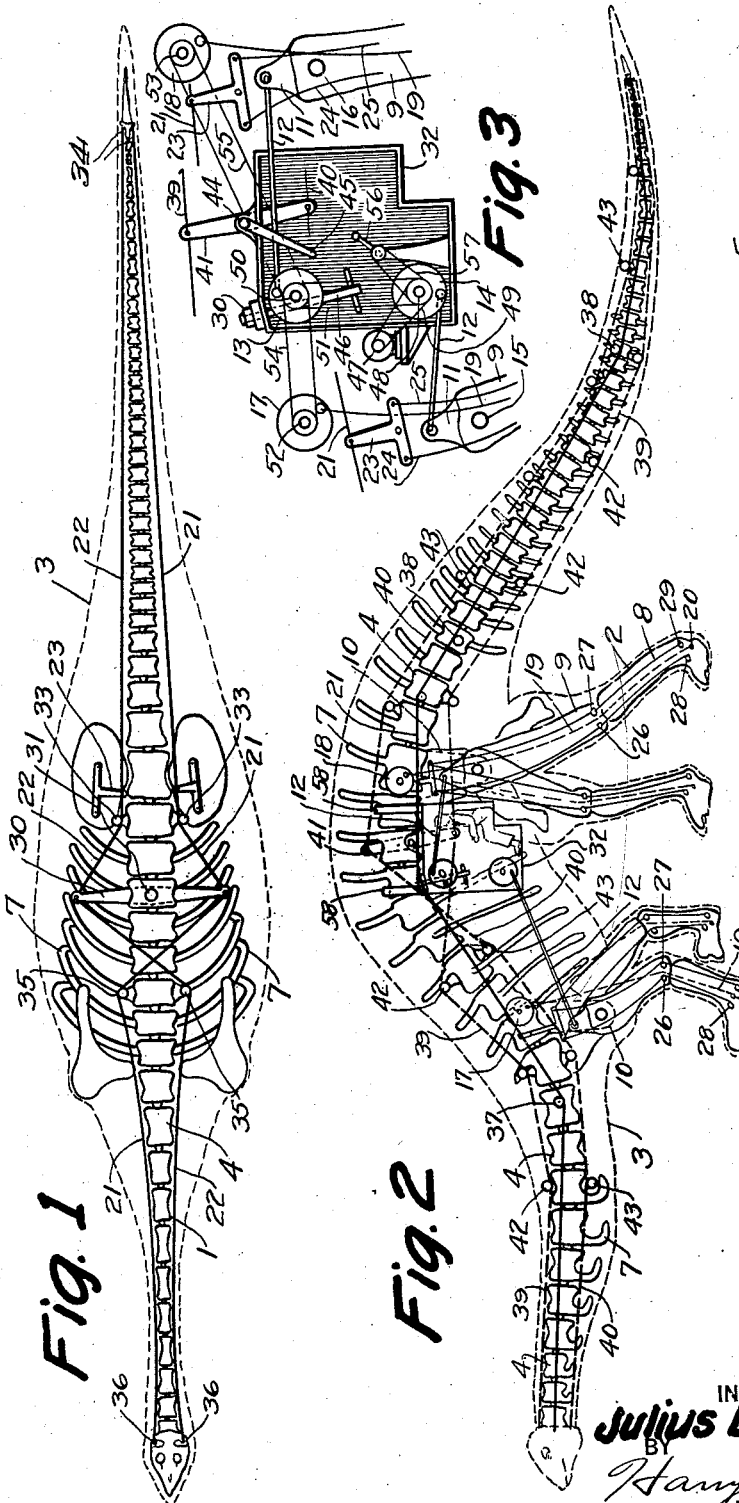
INVENTOR
Julius B. Ellinger
BY
Harry Bowen
ATTORNEY Patented June 24, 1930

1,766,116

UNITED STATES PATENT OFFICE

JULIUS B. ELLINGER, OF SEATTLE, WASHINGTON

MECHANICAL ANIMAL

Application filed March 18, 1929. Serial No. 347,843.

The invention is a mechanically operated animal which is so constructed that parts of the body may move and also so that it may walk.

The object of the invention is to provide a mechanical animal which will have a comparatively natural movement.

Another object of the invention is to provide a mechanically constructed animal which is constructed about a common continuous member similar to a vertebra.

A further object of the invention is to provide a mechanical animal which will operate automatically.

A still further object of the invention is to provide a mechanical animal in which an operator may be contained.

And a still further object of the invention is to provide a mechanically constructed and operated animal which is of a simple and economical construction.

With these ends in view the invention embodies a flexible continuous longitudinal member formed of a plurality of independent sections held together by guy wires or cords, leg members extending downward from the said central member, suitable means for mounting the said guy wires, and a suitable covering for the said device.

Other features and advantages of the invention will appear from the following description taken in connection with the drawings, wherein:—

Figure 1 is a plan view showing the general construction of the device.

Figure 2 is a side elevation of the device with part broken away showing a portion of the operating mechanism.

Figure 3 is a detail showing a portion of the operating mechanism on an enlarged scale.

Figure 4 is a detail showing the individual sections of the vertebra.

In the drawings the device is shown as it would be made wherein numeral 1 indicates the vertebra, numeral 2 the legs, and numeral 3 a suitable covering.

The vertebra 1 is made of a plurality of individual sections 4 having points 5 at one side and recesses 6 to accommodate the points in the other. It will be observed in Figure 4 that the angles of the sides of the points 5 are considerably less than the similar angles of the recesses 6 so that when the tip of the point 5 rests in the vertex of the recess it will have considerable lateral movement.

The sections 4 may be made plane as shown in Figure 4, or may be formed with rib members, as indicated by the numeral 7 which may extend above or below or toward the sides, as shown. These sections may also be of any suitable shape or arranged in any suitable manner to permit a flexible movement of the central member which they form.

The leg members 2 may be made with lower sections 8 and upper sections 9 and the upper sections may be pivotally attached to extensions from one of the sections 4, as shown in dotted lines in Figure 2 and indicated by the numeral 10. In the design shown the upper sections are provided with extensions 11 which are connected by rods 12 to eccentrics 13 and 14, as shown in Figure 3, and it will be observed that as the eccentrics rotate they will move the leg members backward and forward about the pivot points 15 and 16. Other eccentrics 17 and 18 may be positioned above the leg members and connected through a cord 19 to the lower end of the lower leg sections 8, as shown at the points 20, and it will be observed that as these eccentrics rotate they will lift the lower leg members. It is understood, however, that any other suitable means may be used for operating the legs to give them a walking motion. The legs may also be connected to the lateral guy wires, as indicated by the numerals 21 and 22, through pivotally mounted cranks 23 and the lower ends of the cranks connected to the lower portions of the legs by wires 24 and 25 so that the legs will move with the lateral motion of the device. The wires 24 and 25 may pass through pulleys 26 and 27 at the knees and be attached to the lower end of the members 8 at the points 28 and 29. The cables 21 and 22 are attached to a central lever 30 which is pivotally mounted at the point 31 on the upper end of a compartment 32 that may be placed in the device if desired. From the ends of the lever 30 the cables 21 and 22 extend backward around pulleys 33 and along the sides of the member 1 to points 34 where they are connected to the rear end of the member 1. The cables 21 and 22 also extend forward around pulleys 35 and along the sides of the member 1 to the points 36 where they are attached to the forward end of the member 1. The member 1 may also be provided with pulleys 37 at the front and other pulleys 38 at the rear around which the cables 21 and 22 may pass if desired to hold the cables in approximately the center of the member 1.

The device is also provided with longitudinal cables 39 and 40 through which the head and tail are raised and lowered. These cables are connected to a central member 41 which is also mounted on the compartment 32 and it will be observed that these cables pass over pulleys 42 and 43 on the upper and lower sides of the member 1 as shown in Figure 2 to hold the cables in relation to the member 1. The lever 41 is mounted upon a shaft 44 and the shaft is provided with a lever 45 that extends downward into the compartment 32 so that the cables 39 and 40 may be operated from the interior of the compartment by moving the lever 45. The lever 30 may also be operated from the interior of the compartment 32 through a shaft 46 which extends downward into the compartment and upon which the lever 30 is pivotally mounted. The device may also be operated by a motor 47 which will operate a shaft 48 through a belt 49 and the eccentric 14 may be mounted upon this shaft. Another shaft 50 upon which the eccentric 13 is mounted may also be operated from the shaft 48 by a belt 51 and the eccentrics 17 and 18 mounted upon shafts 52 and 53 may be operated from the shaft 50 by belts 54 and 55. A crank 56 may also be provided by which the shaft 48 may be rotated through a belt 57 so that it may be rotated by hand or with a motor as may be desired. The compartment 32 may be suspended from the vertebra 1 by straps 58 as shown in Figure 2, however, it is understood that this compartment may be made in combination with the vertebra or attached to it or formed in any suitable manner. It may also be of any suitable shape or design.

It will be understood that changes may be made in the construction without departing from the spirit of the invention. One of which changes may be in the use of the device with any other similar animal, another may be in the use of other means for installing and operating the cables, another may be in the use of other means for connecting the individual sections of the vertebra, another may be in the arrangement of the cables, as it will be understood that the cables may be arranged to cause the animal to twist or turn in any direction, and still another may be in the use of other means for operating the cables.

The construction will be readily understood from the foregoing description. To use the device it may be constructed as shown and described and it will be observed that as the head bends toward the right the cable 22 will cause the right hand end of the lever 30 to move forward and as the opposite end of the cable is connected to the tail at the point 34 it will also cause the tail to bend toward the right. It will be observed that as the head is raised the cable 40 will draw the upper end of the lever 41 toward the front and thereby pull upon the cable on the upper side of the tail and cause the tail to raise. It is also understood that these cables may be reversed so that the tail will move downward as the head moves upward or vice versa.

These cables may also be operated from the chamber 32 in the center of the device so that it will be possible to move the head or tail upward or downward or toward either side. These cables may also be operated by a motor which may be arranged to operate the legs and as the cables are connected to the legs they may operate the head or tail to move toward either side or upward or downward as the legs operate. It will therefore be observed that with the entire animal built about a continuous flexible vertebra which is flexible in all directions it will be possible to operate the animal so that it will move in any direction with an easy natural movement.

Having thus fully described the invention what I claim as new and desire to secure by Letters Patent, is:

1. In a mechanical animal of the character described, a continuous flexible vertebra comprising a plurality of individual independent sections, means for holding the sections together, and means cooperating with the sections to automatically bend one end of the animal in a direction opposite to which the other is bent.

2. In a mechanically operated device of the character described, a plurality of independent sections, said sections having a point at one side and a recess at the other and arranged so that the point of one section rests in the recess of an adjoining section, suitable cables holding the sections together to form a continuous flexible member, said cables attached to the ends of the said member and adaptable to cause one end to bend with the other, and means for holding the cables to the said member throughout the length thereof.

3. In a mechanically operated device of the character described, a plurality of independent sections, said sections having a point at one side and a recess at the other and arranged so that the point of one section rests in the recess of an adjoining section, suitable cables holding the sections together to form a continuous flexible member, said cables attached to the ends of the said member and adaptable to cause one end to bend with the other, means for holding the cables to the said member throughout the length thereof, and mechanical means for operating the said cables to bend the said member.

4. In a mechanically operated device of the character described, a plurality of independent sections, said sections having a point at one side and a recess at the other and arranged so that the point of one section rests in the recess of an adjoining section, suitable cables holding the sections together to form a continuous flexible member, said cables attached to the ends of the said member and adaptable to cause one end to bend with the other, means for holding the cables to the said member throughout the length thereof, mechanical means for operating the said cables to bend the said member, and a suitable covering for the said member.

5. In a mechanically operated device of the character described, a plurality of independent sections, said sections having a point at one side and a recess at the other and arranged so that the point of one section rests in the recess of an adjoining section, suitable cables holding the sections together to form a continuous flexible member, said cables attached to the ends of the said member and adaptable to cause one end to bend with the other, means for holding the cables to the said member throughout the length thereof, mechanical means for operating the said cables to bend the said member, jointed legs attached to the said central member, and means for operating the said legs with the said member.

6. In a mechanically operated device of the character described, a plurality of independent sections, said sections having a point at one side and a recess at the other and arranged so that the point of one section rests in the recess of an adjoining section, suitable cables holding the sections together to form a continuous flexible member, said cables attached to the ends of the said member and adaptable to cause one end to bend with the other, means for holding the cables to the said member throughout the length thereof, mechanical means for operating the said cables to bend the said member, jointed legs attached to the said central member, means for operating the said legs with the said member, and means whereby the legs may be operated to cause the device to walk.

7. In a mechanical device of the character described, a plurality of individual sections forming a longitudinal member, said sections having points at one side and recesses at the other with the points of one member cooperating with the recesses of the other, a plurality of cables extending along the sides of the said member and attached to the ends thereof, leg members extending downward from the said member, means for operating the said cables to bend the said member, means for operating the said legs, and a suitable covering for the said device.

8. In a mechanically operated device of the character described, a plurality of independent abutting sections, said sections being adaptable to move in all directions in relation to each other, means for holding the sections together, said holding means permitting the member formed by the sections to bend in any direction and being adaptable to cause one end to bend with the other, a plurality of jointed sections extending downward from the said device, said downwardly extending sections being adaptable to support the said device, and means for operating the said downwardly extending sections to propel the said device.

9. In a mechanically operated device of the character described, a plurality of independent sections, said sections having a point at one side and a recess at the other and arranged so that the point of one section rests in the recess of an adjoining section, suitable cables holding the sections together to form a continuous flexible member, said cables attached to the ends of the said member and adaptable to cause one end to bend with the other, means for holding the cables to the said member throughout the length thereof, mechanical means for operating the said cables to bend the said member, said cables being crossed about the midsection of the said device, and a suitable covering for the said member.

In testimony whereof I affix my signature.

JULIUS B. ELLINGER.